United States Patent

Sakamoto et al.

[11] Patent Number: 5,547,144
[45] Date of Patent: Aug. 20, 1996

[54] CABLE REEL OF ELECTRIC SIGNAL TRANSMISSION APPARATUS

[75] Inventors: Yoshito Sakamoto; Takeshi Kihara; Haruo Saen, all of Tochigi, Japan

[73] Assignee: Sumitomo Electric Industries, Ltd., Japan

[21] Appl. No.: 262,042

[22] Filed: Jun. 17, 1994

[30] Foreign Application Priority Data

Jun. 18, 1993 [JP] Japan .................................. 5-147169

[51] Int. Cl.⁶ ..................................................... H01R 39/02
[52] U.S. Cl. ............................................. 242/402; 439/15
[58] Field of Search ......................... 242/388, 388.1, 242/388.5, 388.6, 402; 439/13, 15, 162, 163, 164

[56] References Cited

U.S. PATENT DOCUMENTS

| | | | |
|---|---|---|---|
| 4,844,359 | 7/1989 | Kato | 242/402 |
| 4,904,190 | 2/1990 | Plocek et al. | 439/15 |
| 4,975,063 | 12/1990 | Ida et al. | |
| 5,229,544 | 7/1993 | Horiuchi | 439/15 |
| 5,256,075 | 10/1993 | Miyahara et al. | 439/15 |
| 5,286,219 | 2/1994 | Ueno et al. | 439/15 |

FOREIGN PATENT DOCUMENTS

| | | | |
|---|---|---|---|
| 0243047 | 10/1987 | European Pat. Off. | |
| 0482936 | 4/1992 | European Pat. Off. | 439/13 |
| 0479567 | 4/1992 | European Pat. Off. | 439/13 |
| 4-179081 | 6/1992 | Japan | 439/13 |

*Primary Examiner*—John P. Darling
*Attorney, Agent, or Firm*—Cushman Darby & Cushman, LLP

[57] ABSTRACT

A cable reel of an electric signal transmission apparatus includes a tape-shaped cable for absorbing a relative rotation by tighting and loosening of the windings of the tape-shaped cable, a housing including an inner cylinder having a flange portion and an outer cylinder having side and bottom surface portions, wherein an upper portion of the side surface portion is engaged with and covered by the flange portion of the inner cylinder.

4 Claims, 2 Drawing Sheets

CABLE REEL OF ELECTRIC SIGNAL TRANSMISSION APPARATUS

BACKGROUND OF THE INVENTION

1. Field of the Invention

The present invention relates to a cable reel of an electric signal transmission apparatus for an electrical connection between a stationary matter and a movable matter by using a tape-shaped cable and particularly to a cable reel suitable for use in a steering device of a vehicle.

2. Description of the Related Art

In the case where signal transmission is performed between the handle side of a car and the car body side thereof, such a device as shown in FIG. 2 is used. That is, a tape-shaped cable is spirally accommodated in a housing having an inner cylinder and an outer cylinder so that the rotation of a handle is absorbed by tightening and loosening of the winding of the tape-shaped cable.

As shown in FIG. 2, a conventional cable reel includes a housing having an inner cylinder 1, outer cylinder 2 and holder 12, and a tape-shaped cable 5 which is spirally wound and housed in the housing. The inner top end portion of the tape-shaped cable 5 is pulled out from the housing through a hole 10 of the inner cylinder 1 to the outside of the housing. Then, the tape-shaped cable is assembled to the inner cylinder 1, and the outer top end portion of the tape-shaped cable 5 is pulled out from the housing through a hole 11 of the outer cylinder 2 so that a grasping portion 9 is pulled out from the housing through the hole 11. After the grasping portion 9 is supported around the hole 11, the inner cylinder 1 and outer cylinder 2 are rotatably connected to each other. Further, connecters are fixed to both end portions of the tape-shaped cable 5 being pulled out from the housing so that the inner and outer end portion sides are connected to a control unit and a inflator side, respectively. Accordingly, the tape-shaped cable 5 in the housing makes the electrical connection between the control unit and inflator be possible.

In the apparatus of FIG. 2, there has been a problem in that the structure of the outer cylinder 2 is so complicated that it is difficult to form the outer cylinder 2 through injection molding and the metal mold is quite complicated and expensive. Further, in assembling the cable reel, it is necessary that a tape-shaped cable be passed through holes 10 and 11 formed through the inner and outer cylinders respectively, and that respective end grasping portions 8 and 9 provided on the tape-shaped cable 5 in advance are fixed on the inner and outer cylinders by using a lock mechanism. The work for passing a tape-shaped cable 5 through the respective holes 10 and 11 of the inner and outer cylinders 1 and 2 as described above is troublesome, and the assembly cannot be automatized so long as such work is required.

SUMMARY OF THE INVENTION

In order to solve the above problems, it is an object of the present invention to provide a cable reel for an electric signal transmission in which the efficiency of assembly can be improved and the assembly work can be automatized.

A cable reel of an electric signal transmission apparatus includes: a tape-shaped cable for absorbing a relative rotation by righting and loosening of winding of the tape-shaped cable; beginning and end grasping members which are provided at beginning and end portions of the tape-shaped cable, respectively; an inner cylinder including a cylindrical portion, first flange portion and notch portion into which the end grasping member fits; an outer cylinder including a bottom surface portion having a circular opening into which the cylindrical portion of the inner cylinder is inserted and fixed, and a side surface portion having a guide portion onto which the beginning end grasping member fits; and a holding member having a second flange portion, which is inserted into the cylindrical portion of the inner cylinder except the second flange portion to fit each other; wherein an upper portion of the side surface portion is engaged with and covered by the first flange portion of the inner cylinder.

BRIEF DESCRIPTION OF THE DRAWINGS

In the accompany drawings.

DETAILED DESCRIPTION OF THE PREFERRED EMBODIMENT

Figure 3:
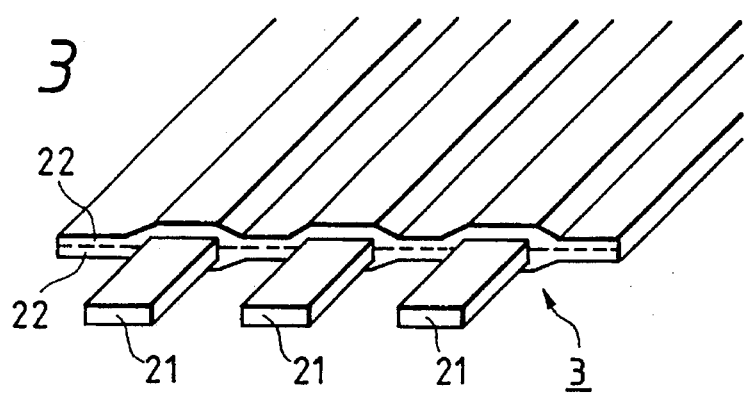
FIG. 3 is a perspective view of an example of a tape-shaped cable used in an embodiment.

An embodiment of the present invention will be described with reference to FIG. 1. An outer cylinder 2 is divided into side and bottom surface portions 2A and 2B. The side surface portion 2A has a guide portion 4 projecting therefrom for drawing a tape-shaped cable out. The bottom surface portion 2B has a bottom projecting portion 15 for supporting a beginning grasping member 7 when fitted to the guide portion 4, and a circular opening portion 17 into which a cylindrical portion 16 of a inner cylinder 1 is inserted. The inner cylinder 1 has a notch portion 3, a flange portion 14 of the upper surface portion and a cylindrical portion 16. A beginning and an end portion of the tape-shaped cable 5 are provided with a beginning and end grasping member 7 and 6 respectively to which molded parts are fitted so as to hold the tape-shaped cable. Further, the beginning and end grasping member 7 and 6 fit to the guide portion 4 and notch portion 3, respectively. The inner cylinder 1 having the notch portion 3 to which the end grasping member 6 is fit is inserted and fit to the inside of the side surface portion 2A so that an upper portion of the side surface portion 2A is engaged with the flange portion 14 of the upper portion of the inner cylinder 1, and further, the upper portion of the side surface portion 2A is covered by the upper surface 14. The cylindrical portion 16 of the inner cylinder 1 fit to the side surface portion 2A is inserted into the circular opening 17 of the bottom surface portion 2B, and a holder 13 having a flange portion is inserted into the cylindrical portion 16 from the bottom except the flange portion to fix each other. Preferable tape-shaped cable 3 used in this embodiment includes a plurality of conductors 21 and insulated members 22 for holding the conductors therebetween. For example, as shown in FIG. 3, two insulated members 22 having a thickness of about 100 μm are laminated to each other to hold three conductors 21 made of tin plated hard copper having a thickness of 0.15 mm and a width of 1.5 mm therebetween.

Figure 1:
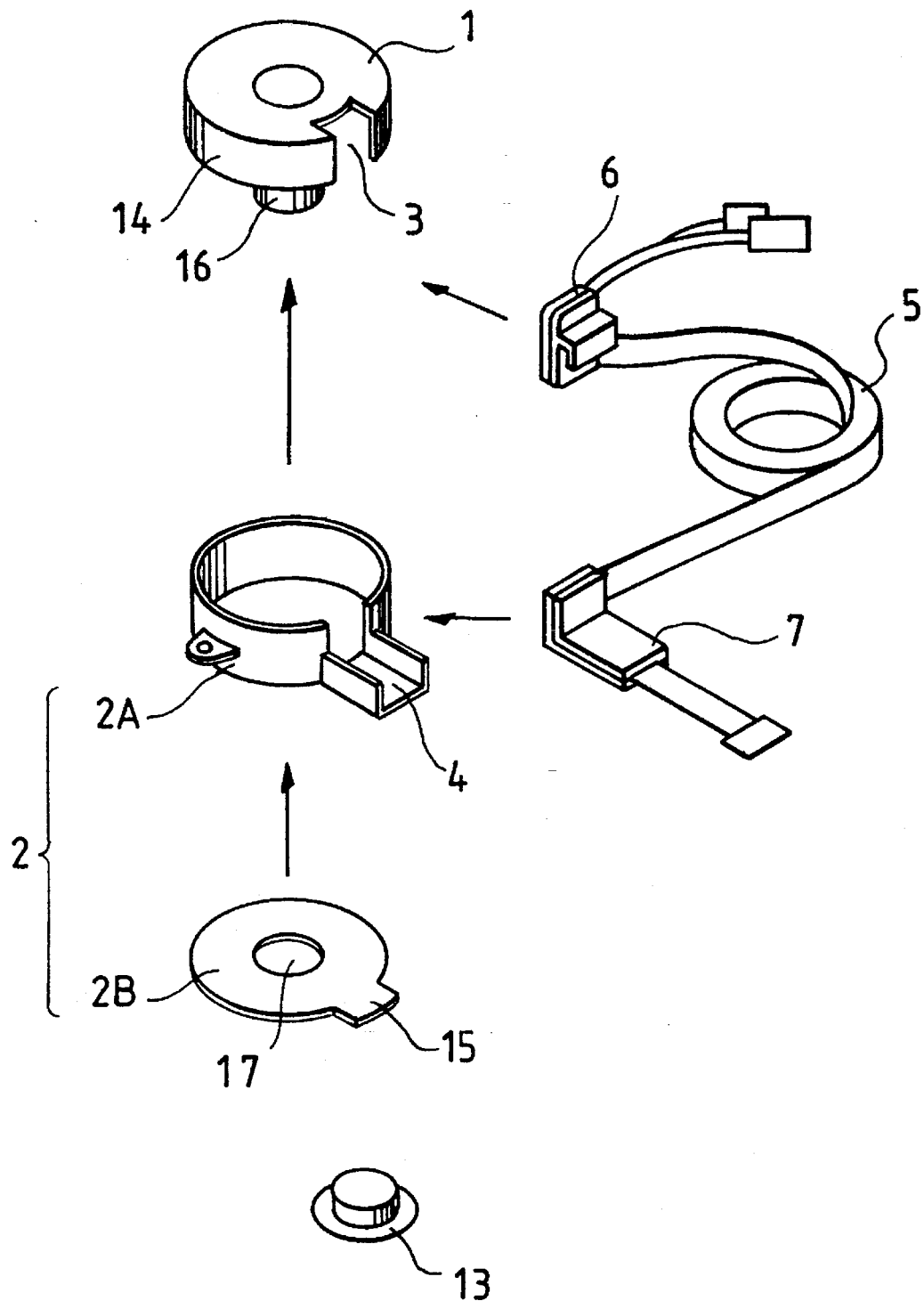
FIG. 1 is a diagram showing a state of the cable reel according to the present invention before assembly.
Figure 2:
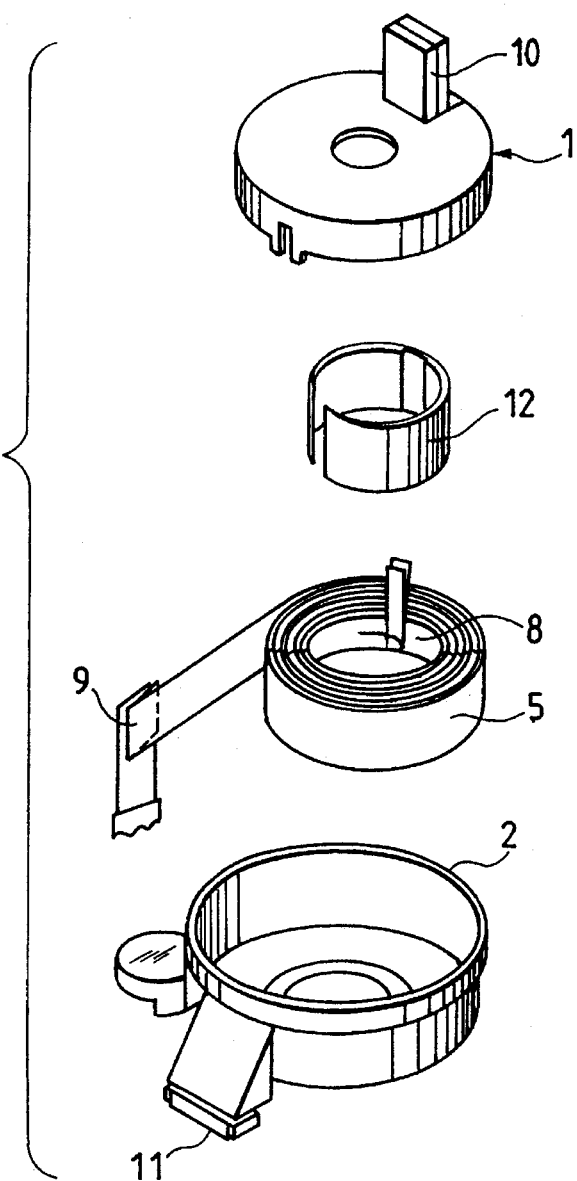
FIG. 2 is a diagram showing a state of the conventional cable reel before assembly.

According to the structure of the cable reel as shown in FIG. 1, it is possible to easily perform injection molding and to simplify the metal mold. Further, assembly can be performed from one direction to thereby improve the efficiency in the assembly work as well as the reliability of the process. In addition, the assembly time of the cable reel in the present invention can be reduced to 30–50% of that of the conventional cable reel assembly time.

What is claimed is:

1. A cable reel of an electric signal transmission apparatus comprising:

a tape-shaped cable for absorbing a relative rotation between an external member that generates an external force and said cable reel by tightening and loosening of windings of said tape-shaped cable, beginning and end grasping members being provided for beginning and end portions of said tape-shaped cable, respectively; and a housing including an inner cylinder having a flange portion and an outer cylinder having side and bottom surface portions, said inner cylinder having a notch portion into which said end grasping member is fitted, and said side surface portion of side outer cylinder has a guide portion onto which said beginning grasping member is fitted;

wherein an upper portion of said side surface portion is engaged with and covered by said flange portion of said inner cylinder.

2. A cable reel according to claim 1, wherein each of said beginning and end grasping members is formed by molded parts which are fitted to each other to hold said tape-shaped cable therebetween.

3. A cable reel of an electric signal transmission apparatus comprising:

a tape-shaped cable for absorbing a relative rotation between an external member that generates an external force said cable reel by tightening and loosening of windings thereof;

beginning and end grasping members disposed at beginning and end portions of said tape-shaped cable, respectively;

an inner cylinder including a cylindrical portion, first flange portion, and notch portion into which said end grasping member fits;

an outer cylinder including a bottom surface portion having a circular opening therein into which said cylindrical portion of said inner cylinder is inserted and fixed, and a side surface portion having a guide portion onto which said beginning end grasping member fits; and a holding member having a second flange portion, which is inserted into said cylindrical portion of said inner cylinder;

wherein an upper portion of said side surface portion is engaged with and covered by said first flange portion of said inner cylinder.

4. A cable reel according to claim 3, wherein each of said beginning and end grasping members is formed by molded parts which are fitted to each other to hold said tape-shaped cable therebetween.

* * * * *